No. 682,571. Patented Sept. 10, 1901.
H. J. SAGE.
APPARATUS FOR BENDING GLASS.
(Application filed Oct. 8, 1900.)
(No Model.)
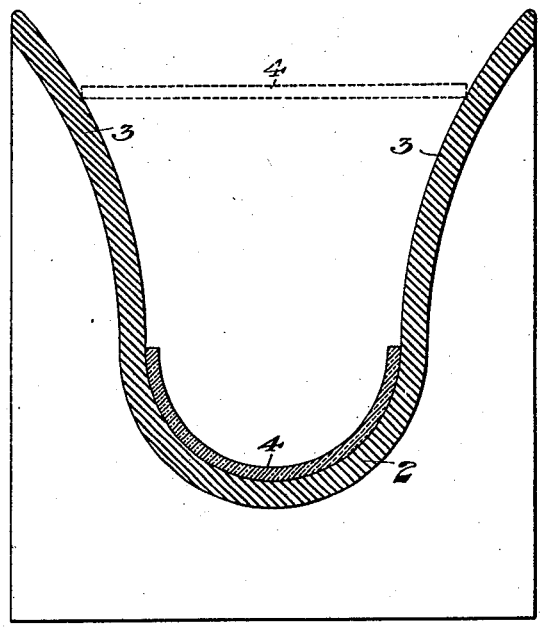
WITNESSES
INVENTOR
Henry J. Sage
by Bakewell & Bakewell
his attorneys.

UNITED STATES PATENT OFFICE.

HENRY J. SAGE, OF BEAVER, PENNSYLVANIA, ASSIGNOR TO THE OPALITE TILE COMPANY, OF PITTSBURG, PENNSYLVANIA.

APPARATUS FOR BENDING GLASS.

SPECIFICATION forming part of Letters Patent No. 682,571, dated September 10, 1901.

Original application filed May 11, 1900, Serial No. 16,320. Divided and this application filed October 8, 1900. Serial No. 32,370. (No model.)

*To all whom it may concern:*

Be it known that I, HENRY J. SAGE, of Beaver, in the county of Beaver and State of Pennsylvania, have invented a new and useful Improvement in Apparatus for Bending Glass, of which the following is a full, clear, and exact description, reference being had to the accompanying drawing, forming part of this specification, in which the figure is a side elevation of my improved apparatus.

The shaping of glass by bending presents in many cases considerable difficulty, especially in bending curved pieces of a large arc. For example, a piece of glass equal to or greater than the semicircumference cannot be bent in a former all sides of which are in an arc of a circle, because the edges of the sheet when placed in the former will overlap or pass beyond the same and the sheet will not settle down into the former in the proper position when softened.

In the drawing, 2 represents the matrix-block, having a surface cavity of the shape to be given to the glass sheet. This cavity at the base is circular; but at the upper portion 3 it extends outwardly or flares on planes more divergent than the side walls of the cavity. The sheet of glass 4 when laid in the cavity rests upon the upper divergent side walls and is confined between the same, and when it is heated it sinks down into the matrix-cavity, as shown by full lines, producing a true and shapely article.

I claim—

1. Apparatus for bending glass, comprising a matrix having guiding-surfaces extending beyond the matrix-cavity, and formed in planes more divergent than the walls of the matrix; substantially as described.

2. Apparatus for bending glass comprising a matrix having a guiding-surface for the glass extending beyond the matrix-cavity and flaring outwardly therefrom on a line different from the curvature of the matrix-cavity; substantially as described.

In testimony whereof I have hereunto set my hand.

HENRY J. SAGE.

Witnesses:
 G. I. HOLDSHIP,
 G. B. BLEMING.